US007220377B2

(12) United States Patent
Nikaido et al.

(10) Patent No.: US 7,220,377 B2
(45) Date of Patent: May 22, 2007

(54) METHOD OF MANUFACTURING SPACER ASSEMBLY USED IN FLAT DISPLAY DEVICE

(75) Inventors: Masaru Nikaido, Yokosuka (JP); Satoshi Ishikawa, Fukaya (JP); Kentarou Shimayama, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 720 days.

(21) Appl. No.: 10/758,420

(22) Filed: Jan. 16, 2004

(65) Prior Publication Data

US 2004/0222346 A1 Nov. 11, 2004

Related U.S. Application Data

(63) Continuation of application No. PCT/JP02/07175, filed on Jul. 15, 2002.

(30) Foreign Application Priority Data

Jul. 17, 2001 (JP) ............................ 2001-217210

(51) Int. Cl.
*B29C 33/60* (2006.01)
*H01J 1/00* (2006.01)

(52) U.S. Cl. ....................... 264/300; 264/620; 264/654

(58) Field of Classification Search ................ 264/654, 264/614, 620, 300, 656, 299, 297.9; 313/238, 313/292

See application file for complete search history.

(56) References Cited

U.S. PATENT DOCUMENTS

| | | | | |
|---|---|---|---|---|
| 5,899,350 | A | 5/1999 | Itoh et al. | |
| 2003/0197459 | A1 * | 10/2003 | Takenaka et al. | 313/422 |
| 2006/0205312 | A1 * | 9/2006 | Takenaka et al. | 445/24 |

FOREIGN PATENT DOCUMENTS

| | | | |
|---|---|---|---|
| EP | 0 982 756 A1 | | 3/2000 |
| EP | 1 189 255 A1 | | 3/2002 |
| JP | 1-298629 | | 12/1989 |
| JP | 2001272926 A | * | 10/2001 |
| JP | 2001272927 A | * | 10/2001 |

* cited by examiner

*Primary Examiner*—Chris Fiorilla
*Assistant Examiner*—Carlos Lopez
(74) *Attorney, Agent, or Firm*—Oblon, Spivak, McClelland, Maier & Neustadt, P.C.

(57) ABSTRACT

A spacer assembly has first and second spacers that are set up integrally on first and second surfaces, respectively, of a substrate. Each spacer is tapered toward its extended end. In forming the spacer assembly, first and second molding dies having through holes coated with a parting agent that contains an organic component are prepared, and these molding dies are located on the first and second surfaces of the substrate so as to be intimately in contact with them, individually. Thereafter, a spacer forming material is filled into the through holes of the molding dies and cured, whereupon the first and second spacers are formed integrally on the substrate surfaces.

12 Claims, 7 Drawing Sheets

METHOD OF MANUFACTURING SPACER ASSEMBLY USED IN FLAT DISPLAY DEVICE

CROSS-REFERENCE TO RELATED APPLICATIONS

This is a Continuation Application of PCT Application No. PCT/JP02/07175, filed Jul. 15, 2002, which was not published under PCT Article 21(2) in English.

This application is based upon and claims the benefit of priority from the prior Japanese Patent Application No. 2001-217210, filed Jul. 17, 2001, the entire contents of which are incorporated herein by reference.

BACKGROUND OF THE INVENTION

1. Field of the Invention

This invention relates to a method of manufacturing a spacer assembly used in a flat display device.

2. Description of the Related Art

A field emission display (FED), plasma display (PDP), etc. are known as modern flat display devices. A display that uses a surface-conduction electron source (hereinafter referred to as SED) is being developed as an FED of a kind.

This SED has a faceplate and a rear plate that are opposed to each other with a given gap between them. These plates have their respective peripheral edge portions jointed together by a rectangular frame-shaped sidewall, thus forming a vacuum envelope. Phosphor layers that glow in three colors are formed on the inner surface of the faceplate. Arranged on the inner surface of the rear plate are a number of emitters that correspond individually to pixels as electron emitting sources for exciting the phosphor. Each emitter is composed of an electron emitting portion, a pair of electrodes that apply voltage to the electron emitting portion, etc.

Further, a plate-shaped grid is located between the two plates. The grid is formed having a number of apertures that are aligned with the emitters. Spacers that maintain the gap between the plates are located on the grid. An electron beam that is emitted from each emitter is transmitted through its corresponding aperture of the grid and applied to a desired phosphor layer.

An SED described in U.S. Pat. No. 5,846,205 is known as a version that has a spacer assembly formed of a grid and spacers that resembles the ones described above. According to this SED, the plate-shaped grid has a number of spacer apertures, and columnar spacers that are a little smaller in diameter than the spacer apertures are passed through the spacer apertures, individually, and are fixedly bonded to the grid with an adhesive agent, frit, solder, or the like. Each spacer projects from both sides of the grid, and its opposite ends engage the respective inner surfaces of a faceplate and a rear plate, individually.

The manufacture of the spacer assembly is very troublesome, however, if it is done by passing the columnar spacers individually into a number of spacer apertures in the grid and fixing them with the adhesive agent or the like in the aforesaid manner, and it is hard to improve the manufacturing efficiency in this case. More specifically, each spacer is very small, having a diameter of hundreds of micrometers and a height of several millimeters, and its corresponding spacer aperture is also very small. Accurately inserting the very small spacers into the spacer apertures of the grid and fixedly bonding them to the grid with the adhesive agent or the like require high assembly accuracy and entail very hard operations. Further, the manufacturing cost is increased, and the manufacturing efficiency is lowered.

In order to reduce the movement of the electron beams, moreover, the spacers should be thinned, and the ratio between the diameter and height, that is, aspect ratio (height/diameter), should be heightened. It is hard, however, to manufacture spacers with high aspect ratios.

BRIEF SUMMARY OF THE INVENTION

This invention has been made in consideration of these circumstances, and its object is to provide a method of manufacturing a spacer assembly, capable of easily manufacturing a spacer assembly of a flat display device.

According to an aspect of this invention, there is provided a method of manufacturing a spacer assembly, which has a substrate and a plurality of columnar spacers provided on the substrate and is used in a flat display device, the method comprising: preparing the substrate and a molding die having a plurality of through holes; forming an organic coating film by applying a parting agent at least to the respective inner surfaces of the through holes of the molding die, the parting agent containing an organic component which is dissipated by being decomposed or burned by heating at a given temperature; locating the molding die on the surface of the substrate so as to be intimately in contact therewith and then filling a spacer forming material into the through holes of the molding die; curing the filled spacer forming material and then heating the substrate and the molding die at a first temperature to decompose or burn at least the organic coating film on the respective inner surfaces of the through holes of the molding die, thereby dissipating the organic coating film; then parting the molding die from the substrate; heating the spacer forming material at a second temperature higher than the first temperature, thereby removing a binder from the spacer forming material, after the molding die is parted; and firing the spacer forming material at a third temperature higher than the first and second temperatures, thereby forming the spacers integrally on the substrate, after the binder removing process.

Further, according to another aspect of this invention, there is provided a method of manufacturing a spacer assembly, which has a plate-shaped grid having a number of beam passage apertures and a plurality of columnar spacers provided integrally on the grid and is used in a flat display device, the method comprising: preparing the plate-shaped grid having first and second surfaces and a plurality of spacer apertures situated individually between the beam passage apertures; preparing first and second plate-shaped molding dies having a plurality of through holes each; forming organic coating films individually by applying a parting agent at least to the respective inner surfaces of the through holes of the first and second molding dies, the parting agent containing an organic component which is dissipated by being decomposed or burned by heating at a given temperature; locating the first and second molding dies on the first and second surfaces, respectively, of the grid so as to be intimately in contact therewith and so that the spacer apertures of the grid and the through holes of the first and second molding dies are in alignment with one another and then filling the spacer forming material into the through holes of the first and second molding dies and the spacer apertures; curing the filled spacer forming material and then heating the grid and the first and second molding dies at a first temperature to decompose or burn at least the organic coating films on the respective inner surfaces of the through holes of the first and second molding dies, thereby dissipating the organic coating films, and parting the first and second molding dies from the grid thereafter; heating the spacer forming material at a second temperature higher than the first temperature, thereby removing a binder from the spacer forming material, after the first and second molding dies are parted; and firing the spacer forming material at a third temperature higher than the first and second temperatures, thereby forming the spacers integrally on the first and second surfaces of the grid, after the binder removing process.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

An embodiment in which this invention is applied to an SED will now be described in detail with reference to the drawings.

Figure 1:
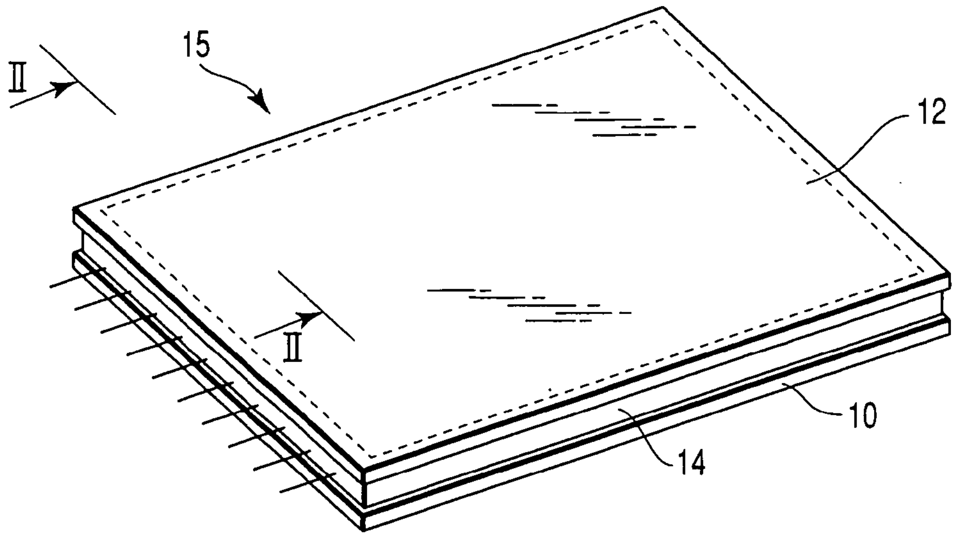
FIG. 1 is a perspective view showing a surface-conduction electron emitting device according to an embodiment of this invention.
Figure 2:
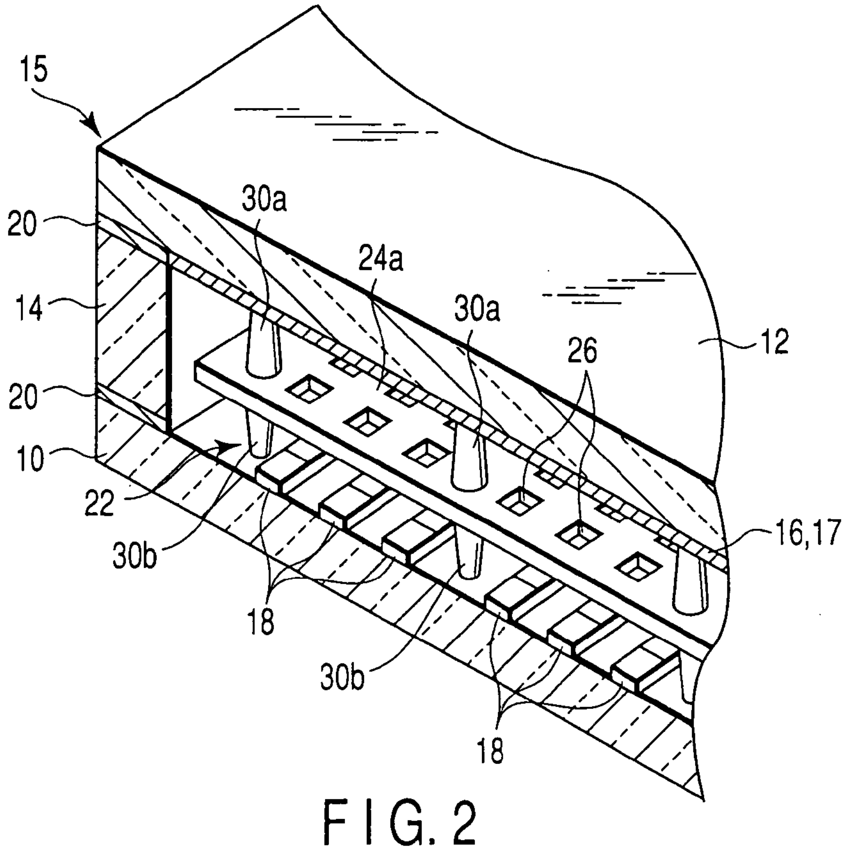
FIG. 2 is a perspective view of the surface conduction electron emitting device, cutaway along line II—II of FIG. 1.
Figure 3:
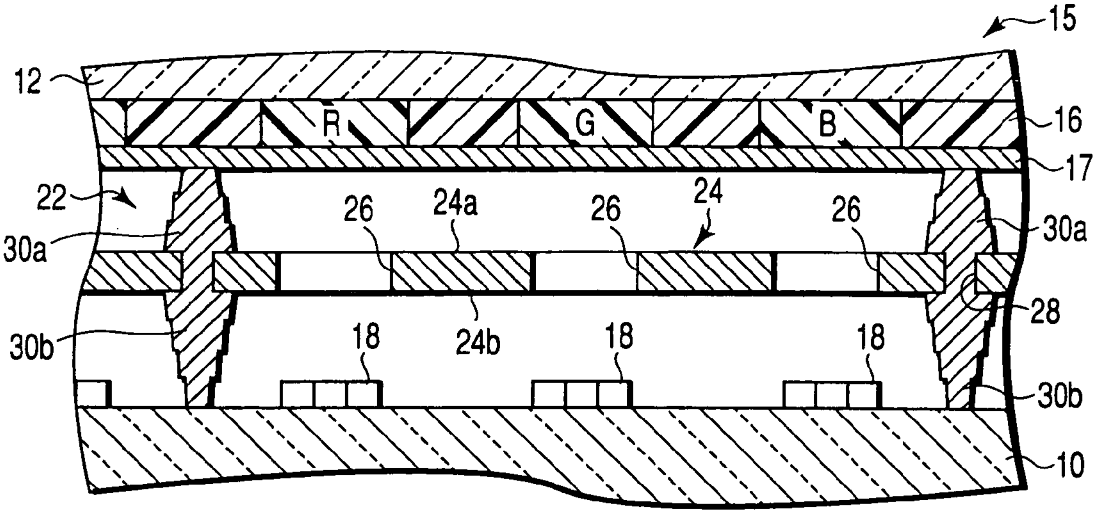
FIG. 3 is an enlarged sectional view of the surface conduction electron emitting device.

As shown in FIGS. 1 to 3, this SED comprises a rear plate 10 and a faceplate 12, which are formed of a rectangular glass plate as a transparent insulating substrate each. These plates are opposed to each other with a gap of about 1.5 to 3.0 mm between them. The rear plate 10 has a size a little larger than that of the faceplate 12. The rear plate 10 and the faceplate 12 have their respective peripheral edge portions jointed together by means of a glass sidewall 14 in the form of a rectangular frame, thus forming a flat rectangular vacuum envelope 15.

A phosphor screen 16 is formed on the inner surface of the faceplate 12. The phosphor screen 16 has phosphor layers, which glow red, blue, and green, individually, and a black colored layer, which are arranged side by side. These phosphor layers are stripe- or dot-shaped. Further, a metal back 17 of aluminum or the like is formed on the phosphor screen 16. A transparent electrically conductive film of ITO or the like, or color filter film may be provided between the faceplate 12 and the phosphor screen.

Provided on the inner surface of the rear plate 10 are a number of surface-conduction electron emitting elements 18 that individually emit electron beams, as electron emitting sources for exciting the phosphor layers. These electron emitting elements 18 are arranged in a plurality of columns and a plurality of rows corresponding individually to pixels. Each electron emitting element 18 is composed of an electron emitting portion (not shown), a pair of element electrodes that apply voltage to the electron emitting portion, etc. Further, a number of wires (not shown) for applying voltage to the electron emitting elements 18 are arranged in a matrix on the rear plate 10.

The sidewall 14 that functions as a joint member is sealed to the respective peripheral end portions of the rear plate 10 and the faceplate 12 with a sealant 20, such as low-melting glass, low-melting metal, etc., thereby jointing the faceplate and the rear plate to each other.

As shown in FIGS. 2 and 3, moreover, the SED is provided with a spacer assembly 22 that is located between the rear plate 10 and the faceplate 12. In the present embodiment, the spacer assembly 22 includes a plate-shaped grid 24 and a plurality of columnar spacers that are set up integrally on the opposite surfaces of the grid.

More specifically, the grid 24, which functions as a substrate, has a first surface 24_a_ that is opposed to the inner surface of the faceplate 12 and a second surface 24_b_ that is opposed to the inner surface of the rear plate 10, and is located parallel to those plates. A number of beam apertures 26 and a plurality of spacer apertures 28 are formed in the grid 24 by etching or the like. The beam apertures 26 that function as beam passage apertures are arranged opposite to the electron emitting elements 18, individually. The spacer apertures 28 are situated individually between the beam apertures and arranged at given pitches.

The grid 24 is formed of an iron-nickel-based metal sheet with a thickness of 0.1 to 0.25 mm, for example, and an oxide film of elements that constitute the metal sheet, e.g., $Fe_3O_4$ or $NiFe_2O_4$, etc. Further, each beam aperture 26 is a rectangular hole that measure 0.15 to 0.25 mm×0.2 to 0.40 mm, and each spacer aperture 28 has a diameter of about 0.1 to 0.2 mm.

First spacers 30_a_ are set up integrally on the first surface 24_a_ of the grid 24 so as to overlap the spacer apertures 28, individually. Their respective extended ends abut against the inner surface of the faceplate 12 directly or through a height moderating layer of low-melting metal, such as In, with the metal back 17 and the black colored layer of the phosphor screen 16 between them. Further, second spacers 30_b_ are set up integrally on the second surface 24_b_ of the grid 24 so as to overlap the spacer apertures 28, individually. Their respective extended ends abut against the inner surface of the rear plate 10 directly or through a height moderating layer of low-melting metal, such as In. The spacer apertures 28 and the first and second spacers 30_a_ and 30_b_ are situated in alignment with one another, and the first and second spacers are coupled integrally to one another through the spacer apertures 28.

Each of the first and second spacers 30*a* and 30*b* integrally has a plurality of step portions that are stacked in layers and have their respective diameters gradually reduced from the side of the grid 24 toward the extended end. Each step portion is in the form of a truncated cone that is tapered from the grid side toward the extended end side of the spacer. Thus, each of the first and second spacers 30*a* and 30*b* is in the form of a stepped truncated cone.

For example, each first spacer 30*a* is in the form of a stepped truncated cone having two or three steps. The diameter of each first spacer end on the side of the grid 24 is about 400 μm, the diameter on the extended end side is about 300 μm, the height ranges from about 0.25 to 0.5 mm, and the aspect ratio (height/grid-side end diameter) ranges from 0.43 to 1.25. Further, each second spacer 30*b* is in the form of a stepped truncated cone having four or five steps. The diameter of each second spacer end on the side of the grid 24 is about 400 μm, the diameter on the extended end side is about 200 μm, the height ranges from about 1 to 1.5 mm, and the aspect ratio ranges from 2.5 to 3.75.

As mentioned before, the diameter of each spacer aperture 28, which ranges from about 0.1 to 0.2 mm, is smaller enough than that of the grid-side end of each of the first and second spacers 30*a* and 30*b*. The first spacers 30*a* and the second spacers 30*b* are arranged integrally in coaxial alignment with the spacer apertures 28. Thus, the first spacers and the second spacers are coupled to one another through the spacer apertures, whereby they are formed integrally with the grid 24 in a manner such that they hold the grid 24 from both sides.

The grid 24 of the spacer assembly 22 constructed in this manner is applied with a given voltage from a power source (not shown) and prevents the electron emitting elements 18 from being damaged by cross talk or discharge caused on the inner surface of the faceplate. Electron beams emitted from the electron emitting elements 18 pass through their corresponding beam apertures 26 and land onto the desired phosphor layers. As the first and second spacers 30*a* and 30*b* engage the respective inner surfaces of the faceplate 12 and the rear plate 10, moreover, they bear the atmospheric load that acts on these plates and keep the distance between the plates at a given value.

The following is a description of a method of manufacturing the spacer assembly 22 constructed in this manner and the SED provided with the same.

Figure 4:
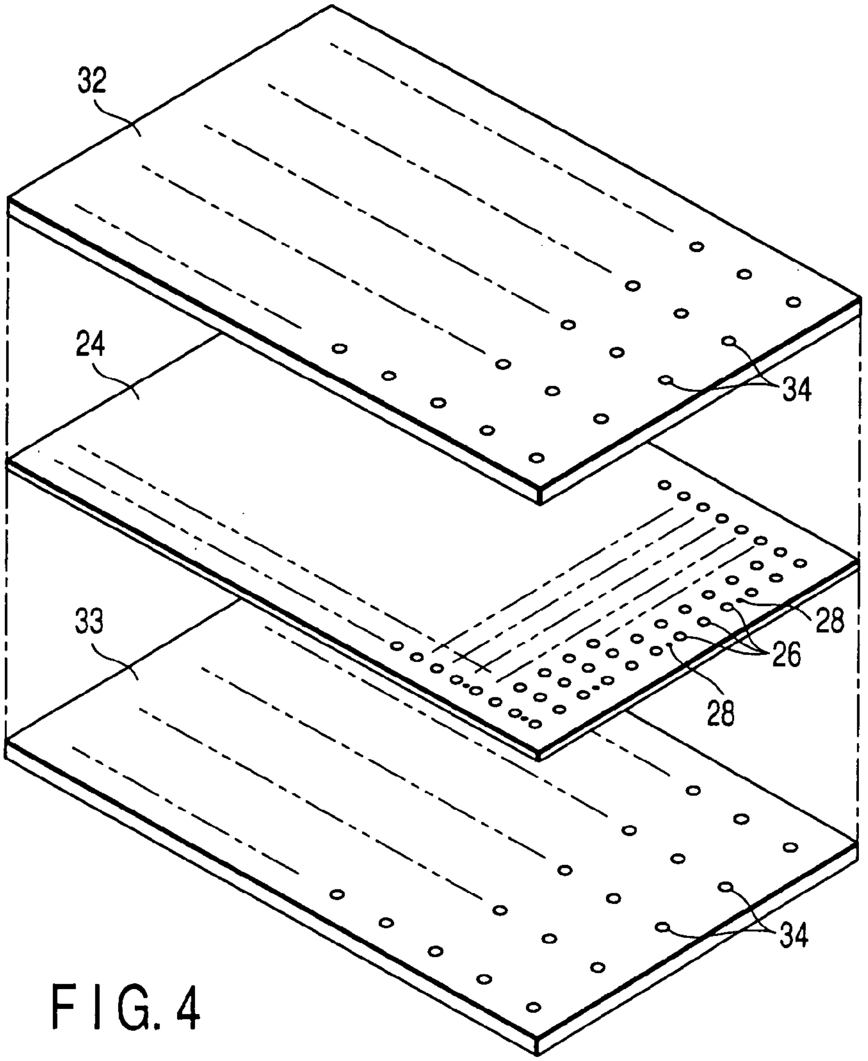
FIG. 4 is an exploded perspective view showing a grid and first and second dies used in the manufacture of a spacer assembly in the surface conduction electron emitting.

In manufacturing the spacer assembly 22, a grid 24 of a given size and first and second dies 32 and 33, each in the form of a rectangular plate and having substantially the same size as the grid, are prepared first, as shown in FIG. 4. The grid 24 is formed previously having the beam apertures 26 and the spacer apertures 28, and its whole outer surface is subjected to, for example, thermal oxidation or caustification, whereby it is coated with a black oxide film.

Figure 5:
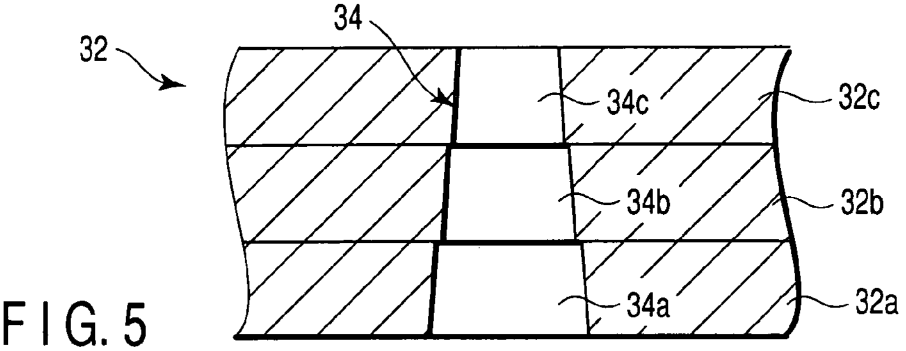
FIG. 5 is an enlarged sectional view showing a part of the first die.

Further, the first and second dies 32 and 33, which function as molding dies, individually, are formed having a plurality of through holes 34 that correspond individually to the spacer apertures 28 of the grid 24. As shown in FIG. 5, the first die 32 is formed by laminating a plurality of thin metal sheets, e.g., three thin metal sheets 32*a*, 32*b* and 32*c*, to one another.

More specifically, each thin metal sheet is formed of an iron-nickel-based metal sheet with a thick of 0.1 to 0.3 mm, and has a plurality of through holes in the form of a truncated cone each. The through holes in each of the thin metal sheets 32*a*, 32*b* and 32*c* have a diameter different from those of the through holes in the other thin metal sheets. For example, through holes 34*a* each in the form of a truncated cone with the maximum diameter of 350 μm are formed in the thin metal sheet 32*a*. Through holes 34*b* each in the form of a truncated cone with the maximum diameter of 295 μm are formed in the thin metal sheet 32*b*. Through holes 34*c* each in the form of a truncated cone with the maximum diameter of 240 μm are formed in the thin metal sheet 32*c*. These through holes 34*a* to 34*c* are formed by etching or laser working.

These three thin metal sheets 32*a*, 32*b* and 32*c* are stacked in layers in a manner such that the through holes 34*a*, 34*b* and 34*c* are aligned substantially coaxially with one another and arranged ascendingly according to diameter. They are diffusively jointed to one another in a vacuum or reducing atmosphere. Thus, the first die 32 is formed having an overall thickness of 0.25 to 0.3 mm. Each through hole 34 is defined by joining the three through holes 34*a* to 34*c* together, and has an inner peripheral surface in the shape of a stepped truncated cone.

On the other hand, the second die 33, like the first die 32, is formed by laminating, for example, four thin metal sheets to one another, and each of its through holes 34 is defined by four truncated-cone-shaped through holes and has an inner peripheral surface in the shape of a stepped truncated cone.

Further, the respective outer surfaces of the first and second dies 32 and 33, including the respective inner peripheral surfaces of the through holes 34, may be coated with a surface layer each. This surface layer is formed by eutectoid plating with a non-oxidizable, high-melting metal, such as Ni—P or Ni—P combined with W, Mo, Re, etc.

Figure 6:
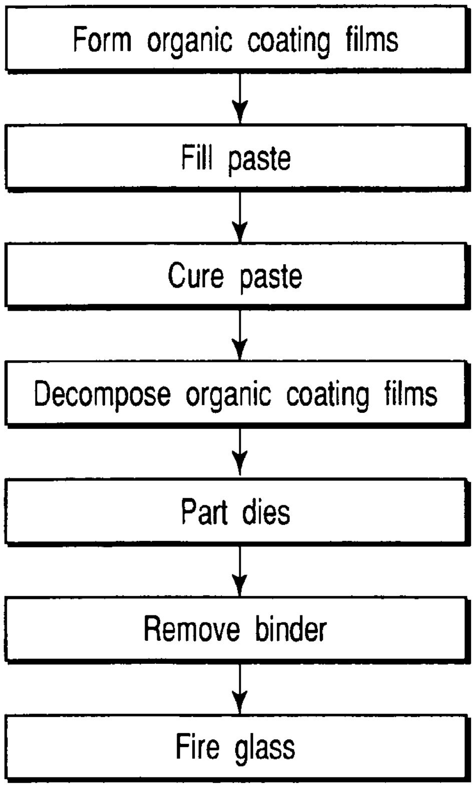
FIG. 6 is a flowchart roughly showing manufacturing processes for the spacer assembly.
Figure 7:
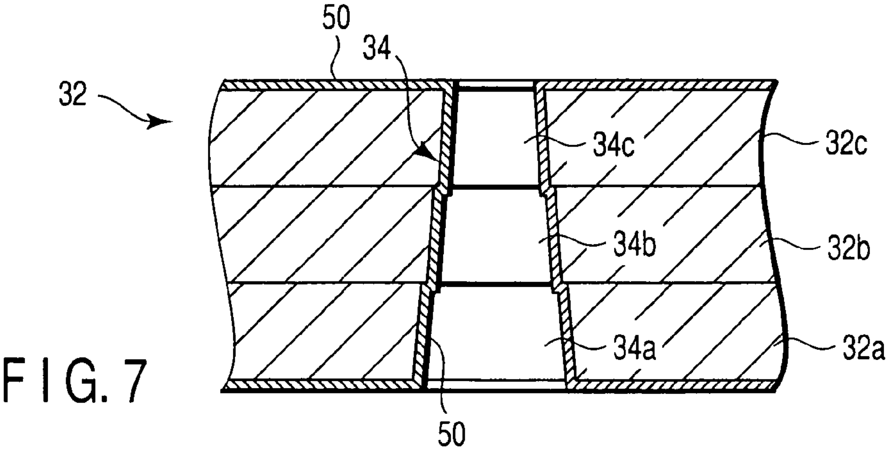
FIG. 7 is a sectional view showing an organic coating film formed on the surface of the first die.

The spacer assembly is manufactured according to the processes shown in FIG. 6. As shown in FIG. 7 that representatively illustrates the first die 32, varnish or some other parting agent that consists mainly of an organic component and is dissolved in an organic solvent is applied to and dried on the respective surfaces of the first and second dies 32 and 33, thereby forming organic coating films 50. The organic coating films 50 are spread by spray coating, dipping, etc., and are formed having a thickness of 50 μm each after they are dried. The heat decomposition temperature (first temperature) of the organic coating films 50 is about 280° C. Organic components that can be used for the parting agent include acrylic resins, epoxy resins, urethane resins, mixtures of these resins, etc.

The organic coating films 50 should only be located at least on the respective surfaces of the through holes 34 of the first and second dies 32 and 33, and they need not always be formed on the respective contact surfaces on the grid and their opposite surfaces.

Figure 8A:
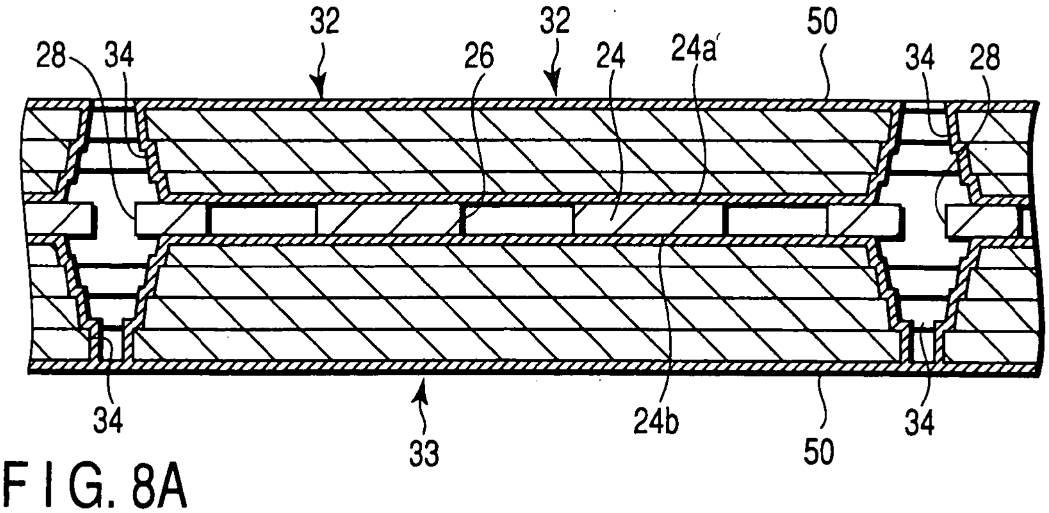
FIGS. 8A, 8B and 8C are sectional views individually showing manufacturing processes for the spacer assembly.

Subsequently, the first die 32 is brought intimately into contact with the first surface 24*a* of the grid 24 so that the large-diameter side of each through hole 34 is situated on the side of the grid, and is positioned so that each through hole 34 is aligned with its corresponding spacer aperture 28 of the grid, as shown in FIG. 8A. Likewise, the second die 33 is brought intimately into contact with the second surface 24*b* of the grid so that the large-diameter side of each through hole 34 is situated on the side of the grid 24, and is positioned so that each through hole 34 is aligned with its corresponding spacer aperture 28 of the grid. The first die 32, grid 24, and second die 33 are fixed to one another by means of a damper (not shown) or the like.

Figure 8B:
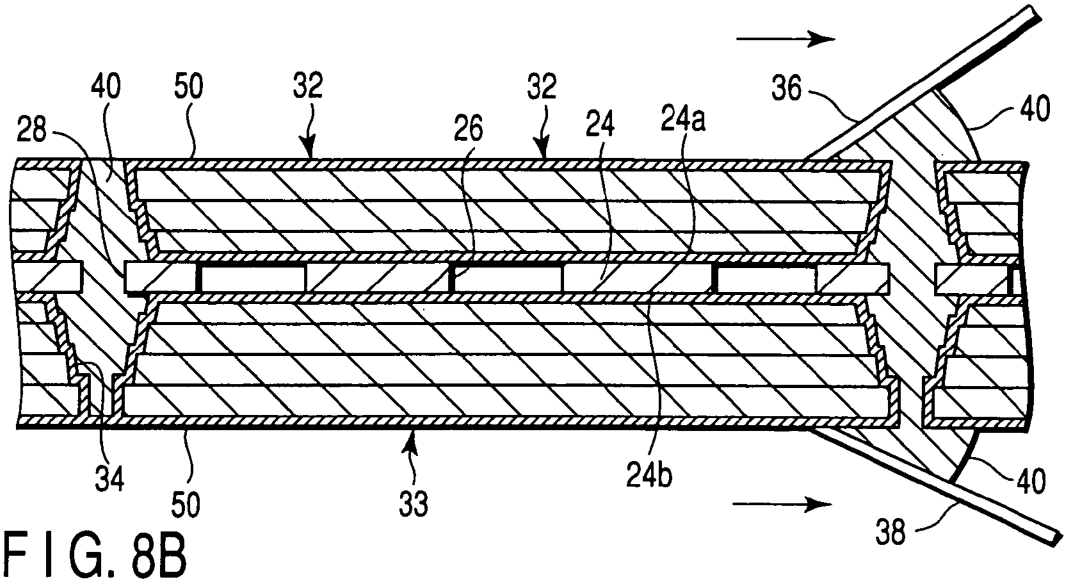

Then, a pasty spacer forming material 40 is supplied from, for example, the outer surface side of the first die 32 by means of a squeegee 36, whereupon the through holes 34 of the first die 32, the spacer apertures 28 of the grid 24, and the through holes 34 of the second die 33 are filled with the spacer forming material, as shown in FIG. 8B. An extra portion of the spacer forming material 40 that is projected onto the outer surface side of the second die 33 is scraped off by means of a squeegee 38.

Glass paste that contains, for example, an ultraviolet-curing binder (organic component) and a glass filler is used as the spacer forming material 40. The heat decomposition temperature (second temperature) of the binder is ranges from about 350° C. to 450° C., that is, the heat decomposition temperature (first temperature) of the organic coating films 50 is set to be lower than the second temperature.

Figure 8C:
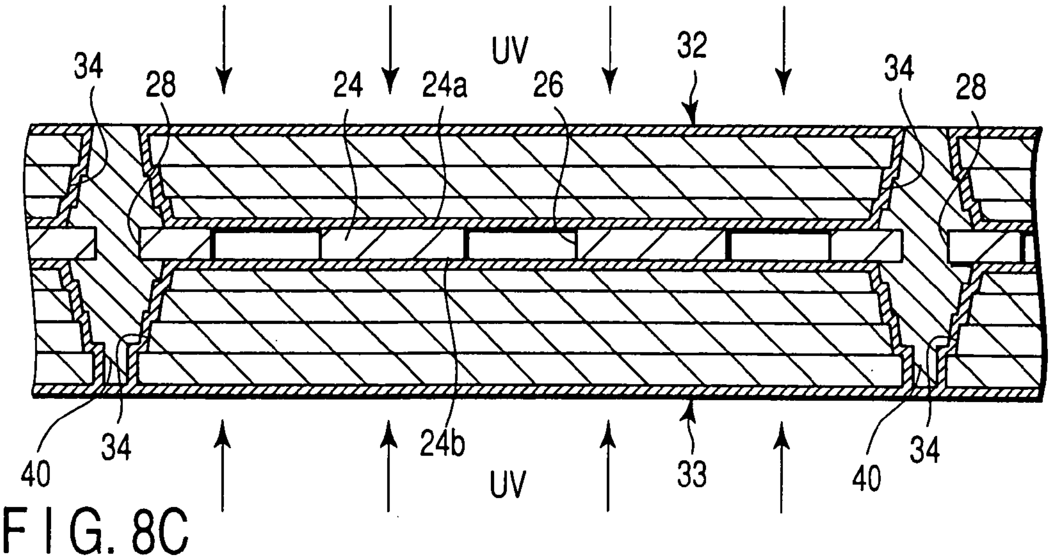

Subsequently, ultraviolet rays (UV) are applied as radiation to the charged spacer forming material 40 from the respective outer surface sides of the first and second dies 32 and 33, as shown in FIG. 8C, whereby the spacer forming material is UV-cured.

Figure 9A:
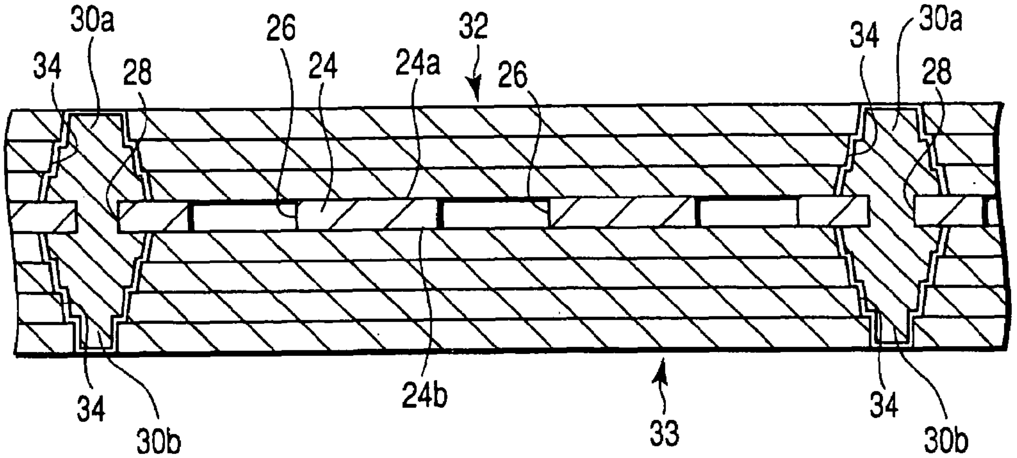
FIGS. 9A and 9B are sectional views individually showing manufacturing processes for the spacer assembly.

After the first and second dies 32 and 33 that are intimately in contact with the grid 24, as shown in FIG. 9A, are located in a heating oven, moreover, they are heated at the first temperature of about 280° C. for 30 minutes or thereabout. Thereupon, the organic coating films 50 on the respective surfaces of the first and second dies 32 and 33 are removed by heat decomposition or combustion. Thus, gaps corresponding to the thickness of the organic coating film are defined between the spacer forming material 40 and the respective inner surfaces of the through holes 34 of the first and second dies 32 and 33, so that the first and second dies can be easily parted from each other.

Figure 9B:
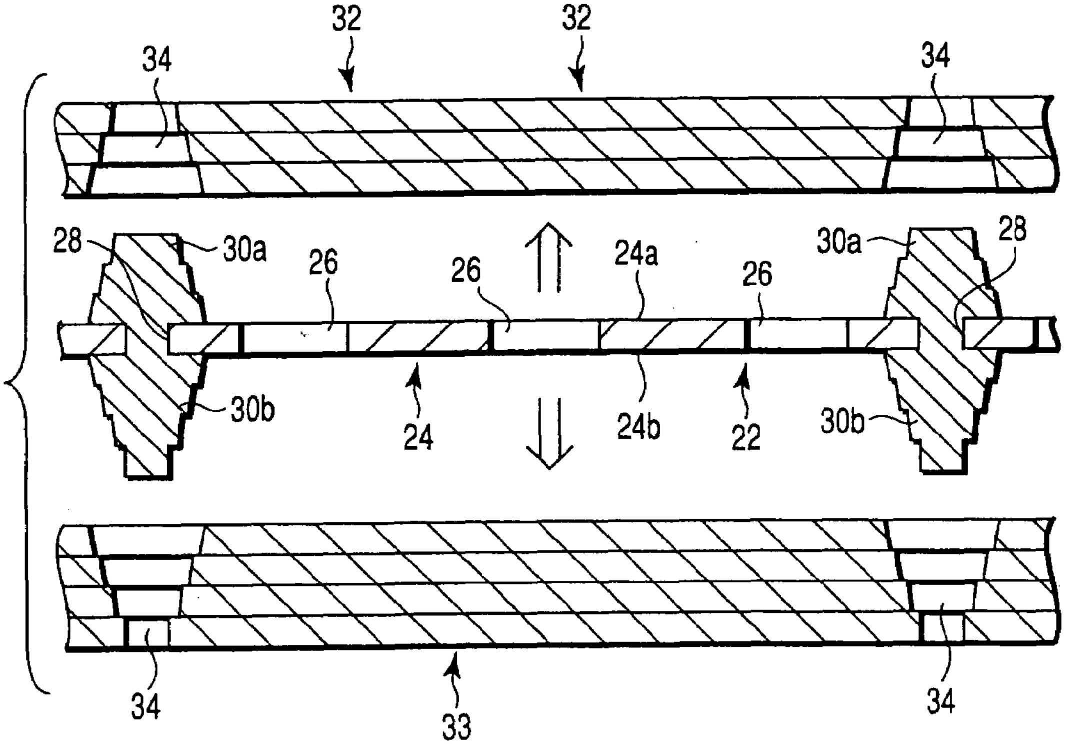

After the first and second dies 32 and 33 and the grid 24 are cooled to a given temperature, thereafter, the first and second dies 32 and 33 are separated from the grid 24, as shown in FIG. 9B.

Then, the grid 24 and the UV-cured spacer forming material 40 are heated at the second temperature of about 350° C. to 450° C. for 60 minutes or thereabout, whereupon a binder removing process is accomplished such that the binder in the spacer forming material 40 is evaporated. Thereafter, the spacer forming material 40 is subjected to regular firing in the heating oven at a third temperature of about 500° C. to 550° C. for 30 to 60 minutes. Thereupon, the first and second spacers 30*a* and 30*b* that are integral with the grid 24 are formed. Thus, the spacer assembly 22 in which the grid 24 has the numerous first and second spacers 30*a* and 30*b* built-in is completed.

In manufacturing the SED with use of the spacer assembly 22 manufactured in this manner, the rear plate 10, which is provided with the electron emitting elements 18 and to which the sidewall 14 is jointed, and the faceplate 12, which is provided with the phosphor screen 16 and the metal back 17, are prepared in advance. The rear plate 10 and the faceplate 12 are located in a vacuum chamber with the spacer assembly 22 positioned on the rear plate. The faceplate 12 is jointed to the rear plate 10 by means of the sidewall 14 with the vacuum chamber evacuated. By doing this, the SED that is provided with the spacer assembly 22 is manufactured.

According to the method of manufacturing the spacer assembly constructed in this manner, a plurality of spacers can be set at a time in given positions on the grid 24 by curing the spacer forming material 40 that is located on the grid by means of the first and second dies 32 and 33. Thus, the spacer assembly provided with a plurality of fine spacers and the SED can be easily obtained at lower manufacturing cost and with improved manufacturing efficiency.

After the spacer forming material 40 is cured, moreover, the first and second dies 32 and 33 are heated to pyrolize the organic coating films 50 of the parting agent. Thereupon, the gaps are formed between the cured spacer forming material and the through holes of the dies, so that the dies can be easily parted from each other. After the dies are parted, the binder removing process and firing are carried out with the cured spacer forming material 40 exposed. By doing this, the spacer forming material can be heated and fired uniformly and efficiently. In consequence, the spacers with uniform the shape, strength, etc. can be obtained.

Further, the first and second dies 32 and 33 are parted from each other when the spacer forming material 40 is subjected to the binder removing and firing. Therefore, the first and second dies should only be formed of a material that can stand the first temperature, so that the heat resistance of the dies can be lowered. Thus, the molding dies can be repeatedly used with less oxidation and deformation, so that the cost of the molding dies can be reduced considerably.

According to the manufacturing method for the spacer assembly described above, the diameter of the spacers 30*a* and 30*b* can be easily adjusted by regulating the thickness of the organic coating films 50. Thus, the diameter of the spacers 30*a* and 30*b* can be reduced, for example, by regulating the thickness of the organic coating films 50, so that the resulting spacer assembly 22 can have the spacers with a high aspect ratio.

According to the present embodiment, on the other hand, each die is formed by laminating a plurality of thin metal sheets, having through holes each, to one another. Usually, it is very hard to form fine through holes of hundreds of micrometers corresponding to the diameter for spacer formation in a metal sheet with a thickness of about 1 mm or more. In contrast with this, fine through holes can be formed relatively easily in a thin metal sheet with a thickness of about 0.1 to 0.3 mm by etching or laser working. As in the present embodiment, therefore, a die having through holes with a desired height can be easily obtained by laminating a plurality of thin metal sheets with the through holes to one another and joining them by thermo compression bonding.

In the die described above, moreover, the through holes in each thin metal sheet are in the form of a truncated cone each, and their diameter varies according to the thin metal sheet. Thus, the die having the desired through holes can be obtained by securely internally connecting the through holes of a plurality of thin metal sheets if the thin metal sheets are dislocated to some degree as they are laminated to one another.

The following is a description of an SED that is provided with a spacer assembly according to a second embodiment of this invention and a manufacturing method therefor.

Figure 10:
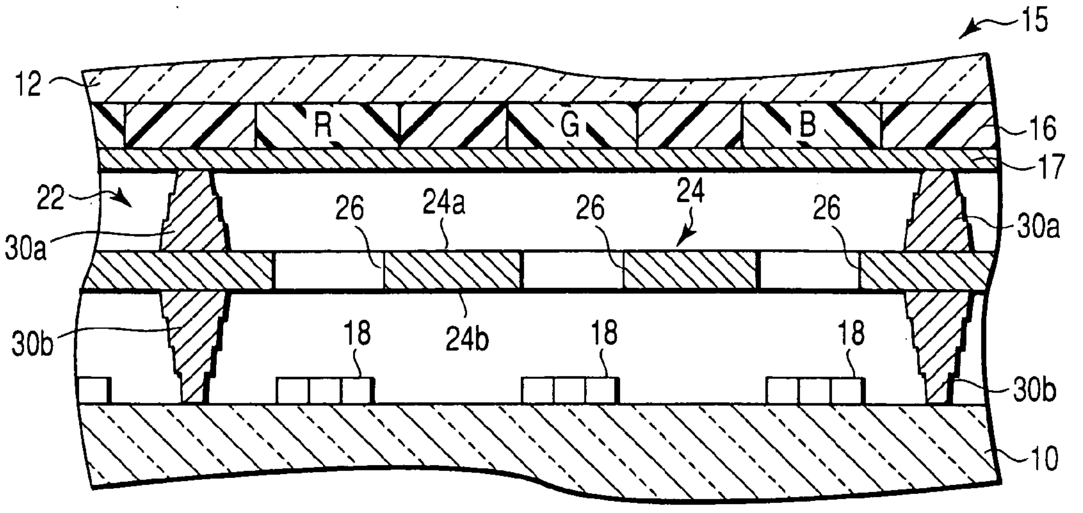
FIG. 10 is a sectional view of a surface-conduction electron emitting device provided with a spacer assembly according to a second embodiment of this invention.

According to the second embodiment, as shown in FIG. 10, a grid 24 of a spacer assembly 22 has no spacer apertures, and first and second spacers 30*a* and 30*b* are formed independently of one another and integrally with the grid 24.

Thus, a plurality of first spacers 30*a* are set up between beam apertures 26 on a first surface 24*a* of the grid 24, and engage the inner surface of a faceplate 12 through a metal back 17 and a black colored layer of a phosphor screen 16. Further, a plurality of second spacers 30*b* are set up between the beam apertures 26 on a second surface 24*b* of the grid 24, abut against the inner surface of a rear plate 10, and are aligned with the first spacers 30*a*, individually. The SED shares other configurations with the SED according to the first embodiment. Therefore, like reference numerals are used to designate like portions, and a detailed description of those portions is omitted.

Figure 11A:
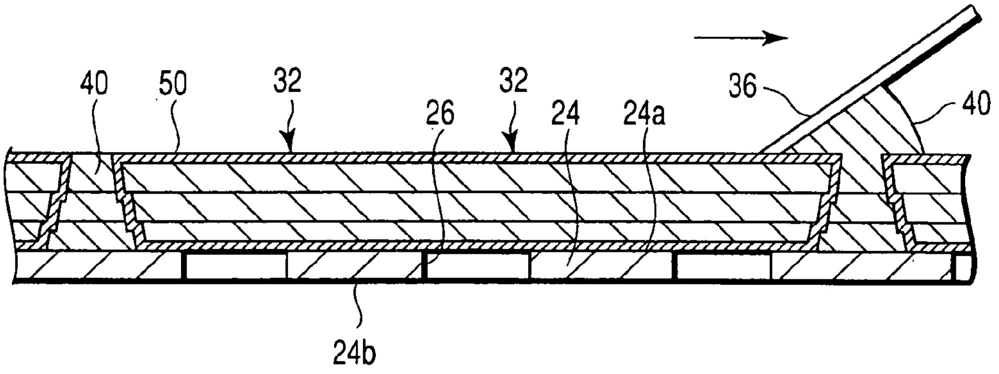
FIGS. 11A and 11B are sectional views individually showing manufacturing processes for the spacer assembly according to the second embodiment.

In manufacturing the spacer assembly 22 having the construction described above, the first die 32 having the organic coating film 50 on its surface is first brought intimately into contact with the first surface 24*a* of the grid 24 so that the large-diameter side of each through hole 34 is situated on the side of the grid, and is positioned so that each through hole is situated between the beam apertures 26 of the grid, as shown in FIG. 11A. Subsequently, the pasty spacer forming material 40 is supplied from the outer surface side of the first die 32 by means of the squeegee 36, whereupon the through holes 34 of the first die 32 are filled with the spacer forming material. The organic coating film 50, spacer forming material 40, and first die 32 used are identical with the ones according to the foregoing embodiment.

Figure 11B:
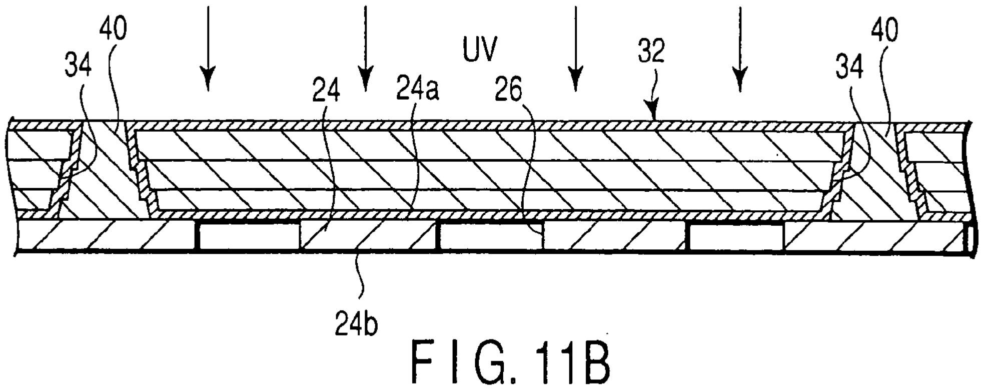

Then, ultraviolet rays (UV) are applied to the spacer forming material 40 that fills the through holes 34 from the outer surface side of the first die 32, as shown in FIG. 11B, whereby the spacer forming material is UV-cured.

Figure 12A:
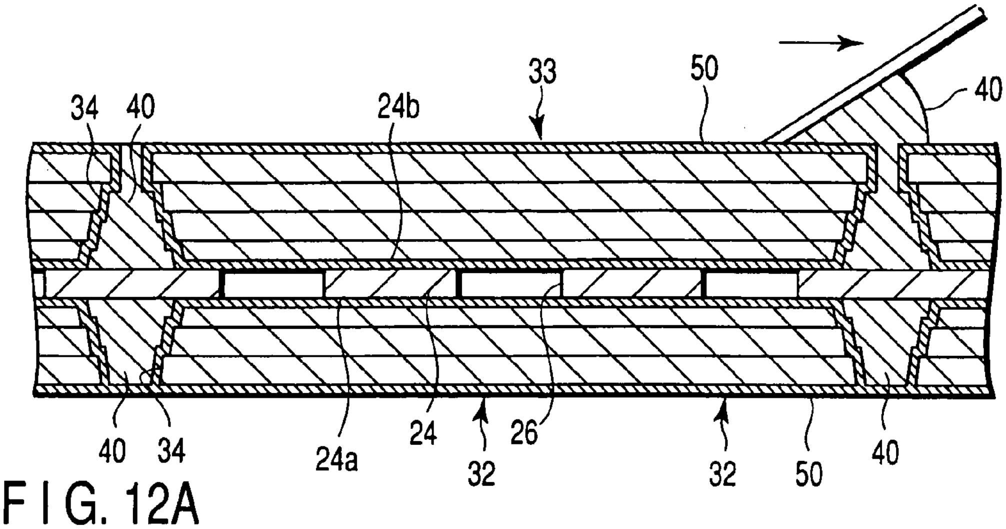
FIGS. 12A, 12B and 12C are sectional views individually showing manufacturing processes for the spacer assembly according to the second embodiment.
Figure 12B:
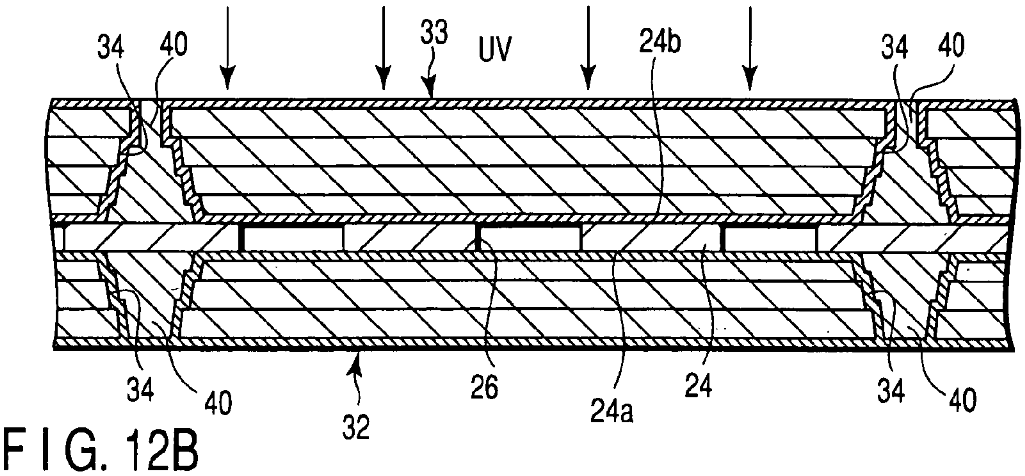

As shown in FIG. 12A, thereafter, the grid 24 and the first die 32 are kept intimately in contact with each other as the second die 33, having the organic coating film 50 formed on its surface, is brought intimately into contact with the second surface 24*b* of the grid 24 so that the large-diameter side of each through hole 34 is situated on the side of the grid 24, and is positioned so that each through hole is situated between the beam apertures 26 of the grid. The first die 32, grid 24, and second die 33 are fixed to one another by means of a damper (not shown) or the like.

Subsequently, the pasty spacer forming material 40 is supplied from the outer surface side of the second die 33 by the squeegee 36, whereupon the through holes 34 of the second die 33 are filled with the spacer forming material. The second die 33 used is identical with the one according to the foregoing embodiment.

Thereafter, ultraviolet rays are applied to the spacer forming material 40 that fills the through holes 34 from the outer surface side of the second die 33, whereby the spacer forming material is UV-cured.

Figure 12C:
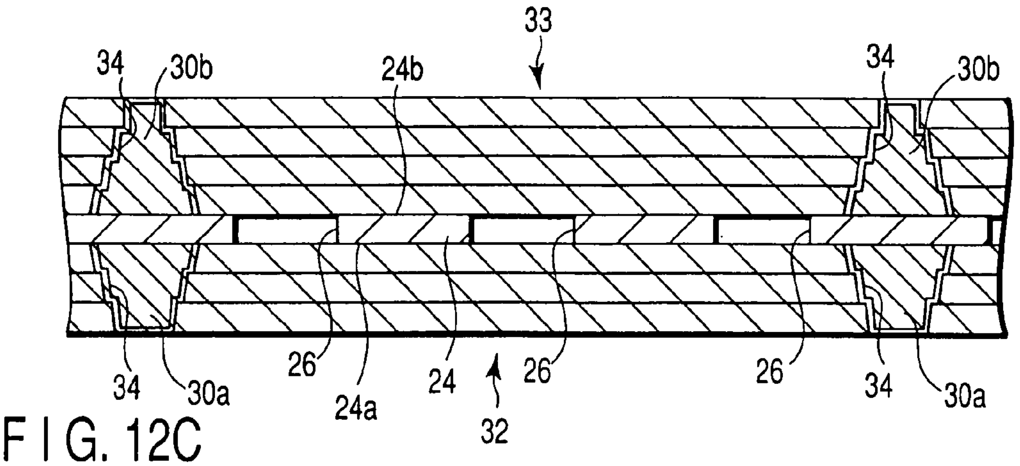

After the first and second dies 32 and 33 that are intimately in contact with the grid 24, as shown in FIG. 12C, are then located in the heating oven, they are heated at the first temperature of about 280° C. for 30 minutes or thereabout. Thereupon, the organic coating films 50 on the respective surfaces of the first and second dies 32 and 33 are removed by heat decomposition. Thus, gaps corresponding to the thickness of the organic coating films 50 are formed between the spacer forming material 40 and the respective inner surfaces of the through holes 34 of the first and second dies 32 and 33, so that the first and second dies can be easily parted from each other.

After the first and second dies 32 and 33 and the grid 24 are cooled to the given temperature, thereafter, the first and second dies 32 and 33 are separated from the grid 24.

Then, the grid 24 and the UV-cured spacer forming material 40 are heated at the second temperature of about 350° C. to 450° C. for 60 minutes or thereabout, whereupon a binder removing process is accomplished such that the binder in the spacer forming material 40 is evaporated. Thereafter, the spacer forming material 40 is subjected to regular firing in the heating oven at the third temperature of about 500° C. to 550° C. for 30 to 60 minutes. Thereupon, the spacer assembly 22 having the grid 24 and the first and second spacers 30*a* and 30*b* integral with it is completed.

The SED that is provided with the spacer assembly 22 constructed in this manner is manufactured according to the same processes of the foregoing embodiment.

The second embodiment arranged in this manner can provide the same functions and effects of the foregoing embodiment.

In the first and second embodiments described above, the spacer assembly is constructed so that the first and second spacers are arranged individually on the opposite surfaces of the grid 24 in an integral manner. Alternatively, however, the first or second spacer may be formed integrally on only one surface of the grid, and the other spacer, first or second, on the rear plate or the faceplate.

Further, this present invention is not limited to the embodiments described above, and that various changes and modifications may be effected therein by one skilled in the art without departing from the scope or spirit of the invention. For example, the spacer forming material is not limited to the aforementioned glass paste, and may be suitably selected as required. Further, the diameter and height of the spacers and the dimensions, material, etc. of the other components may be suitably selected as required. Furthermore, the shape of each spacer is not limited to the shape of a stepped truncated cone, and may alternatively be the shape of a truncated cone without steps or any other shape. The parting agent may be a material that consists mainly of a binder or organic component contained by the spacer forming material and is pyrolized at a lower temperature than the organic component is, and can be selected suitably.

In the foregoing embodiments, the die that is formed by laminating a plurality of metal sheets to one another is used as the molding die. The molding die is not limited to this, however, and may be changed as required.

Further, the ultraviolet-curing binder for use as the spacer forming material may be replaced with a material that contains a thermosetting binder or ultraviolet-curing/thermosetting binder (organic component). After some of the spacer forming material is cured by heating at a given temperature or with ultraviolet rays, in this case, the remainder is cured by heating at the given temperature. The thermal curing temperature for the spacer forming material is adjusted to a temperature lower than the heat decomposition temperature (first temperature) of the organic coating film that is formed of the parting agent.

According to the manufacturing method of the spacer assembly of this invention, the spacers may be reduced in diameter by etching after the spacer assembly is formed according to foregoing embodiments.

In the foregoing embodiments, moreover, the through holes of the dies filled with the spacer forming material after the dies are brought intimately into contact with the grid or glass substrate. Alternatively, the dies may be brought intimately into contact with the grid or glass substrate after the through holes of the dies are filled with the spacer forming material in advance.

Furthermore, this invention is not limited to the SED, and is applicable to various display devices, such as FEDs, PDPs, etc., only if they are flat display devices that are provided with spacers. This invention is not limited to the spacer assembly with the grid, and is also applicable to a method of manufacturing a spacer assembly that includes a metallic or glass substrate with no beam passage apertures, and a plurality of spacers.

What is claimed is:

1. A method of manufacturing a spacer assembly, which has a substrate and a plurality of columnar spacers provided on the substrate and is used in a flat display device, comprising:

preparing the substrate and a molding die having a plurality of through holes;

forming an organic coating film by applying a parting agent at least to the respective inner surfaces of the through holes of the molding die, the parting agent containing an organic component which is dissipated by being decomposed or burned by heating at a given temperature;

locating the molding die on the surface of the substrate so as to be intimately in contact therewith and then filling a spacer forming material into the through holes of the molding die;

curing the filled spacer forming material and then heating the substrate and the molding die at a first temperature to decompose or burn at least the organic coating film on the respective inner surfaces of the through holes of the molding die, thereby removing the organic coating film;

parting the molding die from the substrate after the organic coating film is removed;

heating the spacer forming material at a second temperature higher than the first temperature, thereby removing a binder from the spacer forming material, after the molding die is parted; and firing the spacer forming material at a third temperature higher than the first and second temperatures, thereby forming the spacers integrally on the substrate, after the binder removing process.

2. A method of manufacturing a spacer assembly according to claim 1, wherein the spacer forming material used is a spacer forming material consisting mainly of a glass filler and an ultraviolet-curing, thermosetting, or ultraviolet-curing/thermosetting organic component such that the substrate and the molding die are heated at the first temperature to remove at least the organic coating film on the respective inner surfaces of the through holes of the molding die after the spacer forming material is cured by being irradiated with ultraviolet rays, after the spacer forming material is cured at a temperature lower than the first temperature, or after at least some of the spacer forming material is cured by being irradiated with ultraviolet rays with the remainder cured thereafter at a temperature lower than the first temperature.

3. A method of manufacturing a spacer assembly according to claim 1, wherein the parting agent used is a parting agent consisting mainly of an organic component which is decomposed or burned at a lower temperature than the organic component of the cured spacer forming material is.

4. A method of manufacturing a spacer assembly according to claim 1, wherein the diameter of each spacer is adjusted by regulating the thickness of the organic coating film.

5. A method of manufacturing a spacer assembly according to claim 1, wherein the substrate used is a metallic substrate coated with an oxide film.

6. A method of manufacturing a spacer assembly, which has a plate-shaped grid having a number of beam passage apertures and a plurality of columnar spacers provided integrally on the grid and is used in a flat display device, comprising:

preparing the plate-shaped grid having first and second surfaces and a plurality of spacer apertures situated individually between the beam passage apertures;

preparing first and second plate-shaped molding dies having a plurality of through holes each;

forming organic coating films individually by applying a parting agent at least to the respective inner surfaces of the through holes of the first and second molding dies, the parting agent containing an organic component which is dissipated by being decomposed or burned by heating at a given temperature;

locating the first and second molding dies on the first and second surfaces, respectively, of the grid so as to be intimately in contact therewith and so that the spacer apertures of the grid and the through holes of the first and second molding dies are in alignment with one another and then filling the spacer forming material into the through holes of the first and second molding dies and the spacer apertures;

curing the filled spacer forming material and then heating the grid and the first and second molding dies at a first temperature to decompose or burn at least the organic coating films on the respective inner surfaces of the through holes of the first and second molding dies, thereby dissipating the organic coating films, and parting the first and second molding dies from the grid thereafter;

heating the spacer forming material at a second temperature higher than the first temperature, thereby removing a binder from the spacer forming material, after the first and second molding dies are parted; and firing the spacer forming material at a third temperature higher than the first and second temperatures, thereby forming the spacers integrally on the first and second surfaces of the grid, after the binder removing process.

7. A method of manufacturing a spacer assembly according to claim 6, wherein the spacer forming material used is a spacer forming material consisting mainly of a glass filler and an ultraviolet-curing, thermosetting, or/and ultraviolet-curing/thermosetting organic component such that the substrate and the molding die are heated at the first temperature to dissipate at least the organic coating films on the respective inner surfaces of the through holes of the molding die after the spacer forming material is cured by being irradiated with ultraviolet rays, after the spacer forming material is cured at a temperature lower than the first temperature, or after at least some of the spacer forming material is cured by being irradiated with ultraviolet rays with the remainder cured thereafter at a temperature lower than the first temperature.

8. A method of manufacturing a spacer assembly according to claim 6, wherein the parting agent used is a parting agent consisting mainly of an organic component which is decomposed or burned at a lower temperature than the organic component of the cured spacer forming material is.

9. A method of manufacturing a spacer assembly according to claim 6, wherein the diameter of each spacer is adjusted by regulating the thickness of the organic coating films.

10. A method of manufacturing a spacer assembly according to claim 6, wherein the grid used is a grid formed of a metal sheet having an oxide film on the surface thereof.

11. A method of manufacturing a spacer assembly, which has a plate-shaped grid having a number of beam passage apertures and a plurality of columnar spacers provided on the grid and is used in a flat display device, comprising:

preparing the plate-shaped grid having first and second surfaces;

preparing first and second plate-shaped molding dies having a plurality of through holes each;

forming organic coating films individually by applying a parting agent at least to the respective inner surfaces of the through holes of the first and second molding dies, the parting agent containing an organic component which is dissipated by being decomposed or burned by heating at a given temperature;

locating the first molding die on the first surface of the grid so as to be intimately in contact therewith and then filling a spacer forming material into the through holes of the first molding die;

curing the spacer forming material filled into the through holes of the first molding die;

locating the second molding die on the second surface of the grid so as to be intimately in contact therewith and then filling the spacer forming material into the through holes of the second molding die;

curing the spacer forming material filled into the through holes of the second molding die;

heating the grid and the first and second molding dies at a first temperature to decompose or burn at least the organic coating films on the respective inner surfaces of the through holes of the first and second molding dies, thereby dissipating the organic coating films, after the spacer forming material is cured and parting the first and second molding dies from the grid thereafter;

heating the spacer forming material at a second temperature higher than the first temperature, thereby removing a binder from the spacer forming material, after the first and second molding dies are parted; and firing the spacer forming material at a third temperature higher than the first and second temperatures, thereby forming the spacers integrally on the first and second surfaces of the grid, after the binder removing process.

12. A method of manufacturing a spacer assembly according to claim 11, wherein the grid used is a grid formed of a metal sheet having an oxide film on the surface thereof.

* * * * *